United States Patent [19]

Hosegood et al.

[11] Patent Number: 4,796,377
[45] Date of Patent: Jan. 10, 1989

[54] LINE WEIGHT OR CLEAT

[76] Inventors: David C. Hosegood, 7 Fulmar Close, Lordswood, Southampton SOI 8E2 Hampshire; Samuel B. Hosegood, Shipstal Point, Arne, Wareham, Dorset BH20 5BL, both of England

[21] Appl. No.: 131,376

[22] Filed: Dec. 10, 1987

[30] Foreign Application Priority Data

Jan. 23, 1987 [GB] United Kingdom ............... 8701499

[51] Int. Cl.⁴ .............................................. A01K 75/06
[52] U.S. Cl. ................................................... 43/43.1
[58] Field of Search ................... 43/44.88, 44.91, 43.1

[56] References Cited

U.S. PATENT DOCUMENTS

| | | | |
|---|---|---|---|
| 2,393,070 | 1/1946 | Saloun | 43/44.91 |
| 2,444,791 | 7/1948 | Stahnke et al. | 43/44.88 |
| 3,043,043 | 7/1962 | Parry | 43/43.1 |
| 3,500,576 | 3/1970 | Ostrom | 43/43.12 |
| 3,557,486 | 1/1971 | Wright | 43/44.89 |
| 3,701,212 | 10/1922 | Gilliam | 43/44.87 |
| 3,755,953 | 9/1973 | Mliner | 43/43.11 |
| 3,991,506 | 11/1976 | Wise | 43/44.88 |
| 4,351,128 | 9/1982 | Sivertsen | 43/44.91 |
| 4,459,775 | 7/1984 | Ratte | 43/44.91 |
| 4,563,831 | 1/1986 | Gibney | 43/44.91 |
| 4,693,031 | 9/1987 | Koetje | 43/43.1 |

FOREIGN PATENT DOCUMENTS

| | | | |
|---|---|---|---|
| 101434 | 3/1963 | Norway | 43/43.1 |
| 37092 | 12/1906 | Switzerland | 43/43.1 |
| 751511 | 6/1956 | United Kingdom . | |
| 1313437 | 4/1973 | United Kingdom . | |
| 2134361 | 8/1984 | United Kingdom . | |
| 2139861 | 11/1984 | United Kingdom . | |

*Primary Examiner*—M. Jordan
*Attorney, Agent, or Firm*—Parmelee, Bollinger & Bramblett

[57] ABSTRACT

A shaped cleat, comprising a body with one or more guides or grooves for the location of a line provided around the main body, and (optionally) one or more holes passing from or close to the line guide or guides close to or through the centre of the cleat and right through the cleat. The cleat can be mounted individually on to a line, e.g. using a knot, used to join two or more lines together, or used to attach one or more lines to a solid object. The cleat can be used as a fishing weight or float and can be manufactured in any solid material, including material which are not toxic to living organisms. The cleat can be mounted on to a line without knots and without access to the ends of the line.

6 Claims, 2 Drawing Sheets

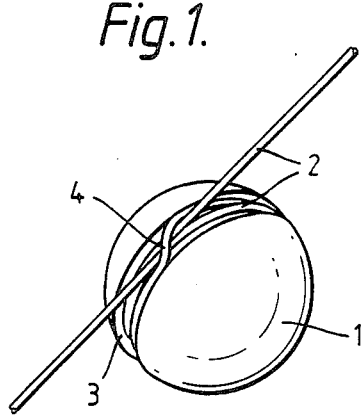
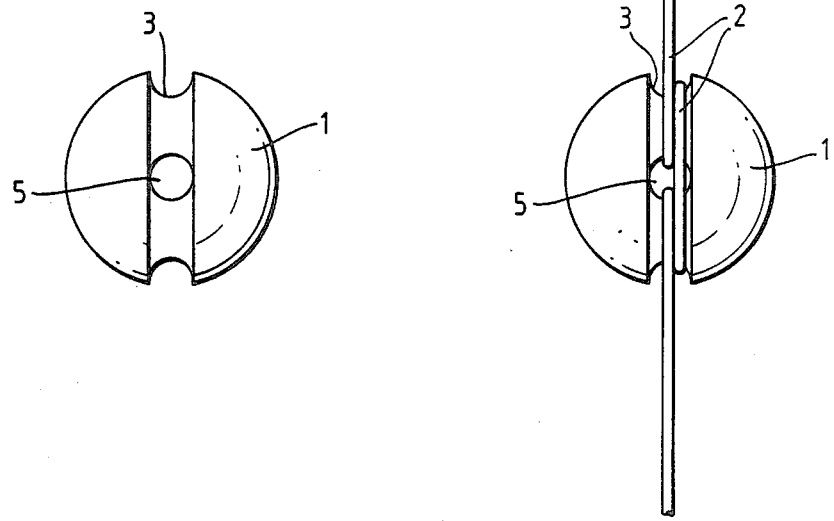

LINE WEIGHT OR CLEAT

FIELD OF THE INVENTION

This invention relates to weights (and also, depending on the material density, floats) for fixing on a line, e.g. a fishing line, and to cleats in general.

BACKGROUND OF THE INVENTION

Cleats are well-known devices which are used to attach flexible lines to objects such as ships masts.

Fishing weights are well-known devices which are used to control the position of fishing lines, baits, lures and nets.

Lead shot is presently used for angling, by crimping it on to a fishing line, but is causing damage to swans and wildfowl from lead poisoning. Alternatives to lead shot are often too hard to crimp on to fishing line without damaging either the weight or line. Soft non-toxic alternatives to lead shot which are capable of being crimped on to fishing line are non-transparent and often expensive.

Fishing weights having an axial hole are known. These are threaded on to a line, for use. A major disadvantage is that the hook must be removed from the line before such a weight can be removed or changed. It is desirable to avoid that disadvantage.

PRIOR ART

U.S. Pat. No. 4,351,128 discloses a bobber or sinker which comprises an elongated cylindrical or barrel-shaped body having a longitudinal passage therethrough, and a line-receiving slot extending radially from the passage to the outside of the body. A fish line-retaining clip extends from the top to the bottom of the body; it is rotatably mounted, to engage the slot and hold a line on the body, or to allow placement of the line on, or its removal from, the body. The outer edge of the clip has a longitudinal groove around which the line may be wound, and thereby firmly secured to the body.

GB-A-No. 0751511 discloses a relatively simple, one-piece sinker weight which has a longitudinal slot along which the line can be laid, and means for securing the line to the weight at each end of the slot. The illustrated means are helical wire coils. A line can be simply attached to, and detached from, such a weight, and the weight slides freely along the line. However, the construction of such a sinker involves the joining together of three parts, i.e. the slotted weight and two, say, coils, e.g. by brazing, soldering or incorporation during casting.

SUMMARY OF THE INVENTION

For use as a fishing weight, a translucent one-piece body has a circumferential line guide around which a fishing line can pass and be held therein. If the line is held sufficiently tightly by the line guide, it may simply pass tangentially into, around (one or more times), and tangentially out of the line guide. In order to secure the line on the body, it may be desirable to knot the line, pass a loop of the knot around the line guide and tighten the knot. If the knot is, for example, a clove-hitch, the line which does not form part of the knot, i.e. the essential fishing line, can maintain a generally rectilinear path, while the line and the body are freely moveable relative to each other.

DESCRIPTION OF THE DRAWINGS

Each of FIGS. 1 to 5 is a view of an embodiment of an invention described herein; in several cases, a line 2 is shown attached to a line weight or cleat 1.

DETAILED DESCRIPTION OF THE INVENTION

FIG. 1 shows an essentially spherical body 1 in which there is an essentially equatorial line guide in the form of a circular circumferential V-shaped groove 3. The line 2 has been fixed on the body 1 by knotting a clove-hitch at 4, passing the loop of the knot around the groove 3, and pulling the line tight.

FIG. 2 shows an essentially spherical cleat 1 having an essentially equatorial line guide in the form of a circumferential groove 3 and, along a diameter of the sphere, a passage 5. FIG. 3 is a different view of the same cleat 1, but to which a line 2 has been fixed by passing a loop through the passage 5 and then around the groove 3.

Figure 4:
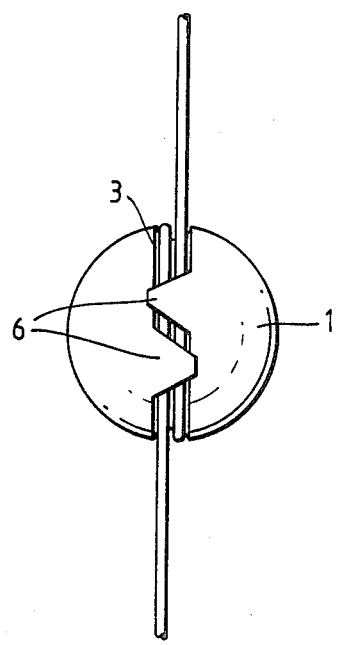

FIG. 4 shows an essentially spherical cleat 1 having an essentially equatorial line guide in the form of a circumferential groove 3 and two rigid members 6 which overlap the groove 3. A line 2 is fixed to the line weight 1 by passing the line 2 under the members 6, around the groove 3, and again under members 6.

Figure 5:
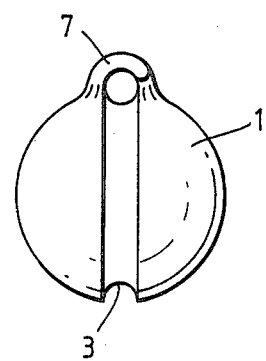

FIG. 5 shows a cleat 1 similar to that illustrated in FIG. 4, but with a flexible member 7 instead of the rigid members 6. The flexible member 7 can be bent open and, after the line 2 has been laid around the groove 3, closed to fix the line 2 in position.

The following features are associated with the present invention:

1. The cleat can be mounted individually on to a line remotely from any other solid object.

2. The cleat can be attached to a flexible line anywhere along any length of line, without access to either end of the line.

3. No knots are necessary (although a very simple knot is preferred) to attach the cleat to the line. The cleat can be moved along the line, if desired.

4. The continuation of a circumferential groove and a knot, or circumferential groove with a hole passing from one side of the cleat to the other, on or adjacent to the groove, holds the line in position on the cleat; illustrated by FIGS. 1 to 3. Such products are simple to construct, e.g. by machining or in a two-part mould, and can be cheap to produce.

5. One or more protrusions on the cleat and the shape of the cleat can hold the loop or loops of line in position on the cleat. The protrusions can be rigid or flexible, such that flexible protrusions can be used to close up the slot through which the line is placed, thus providing extra line restraint; illustrated by FIG. 5.

6. If the line is placed under a tensile force, the major stress on the cleat can be made to be compressive, since the tendency of the loop or loops of line around the cleat body is to compress the cleat body.

7. The form of the cleat ensures that the line entering the cleat is lined up with the line exiting the cleat. This ensures that the vectors of tensile force entering and leaving the cleat are lined up and opposing each other and so produce either no force couple or a minimum force couple; illustrated by FIGS. 1 to 4.

8. By looping the line around the major part of the cleat and (if a hole is present) by radiusing the hole entry, the diameter of the bend radii in the line are maximised for any particular size of cleat. This ensures that local distortion in the line, and hence strength reduction of the line, is kept to a minimum. The surface finish of the material in contact with the line should be smooth to minimise wear on the line.

9. Small remote cleats used to replace "lead shot" in angling use can be manufactured in a non-toxic material, including glass and other materials which are strong in compression but relatively weak against other types of stress. Especially for such use, the maximum diameter of the cleat is likely to be less than 10 mm.

10. The cleat is prevented from slipping on the line by friction between the loop or loops of line and the cleat material. Increasing tensile force on the line produces increasing friction by means of the increased force applied by the line on to the cleat. A surface finish which increases friction can be applied to the surface of the cleat in contact with the line. A "V" shaped groove or similar can be provided around the body of the cleat to provide extra grip on to the line.

Shaped transparent bodies are known but, according to the present invention, such bodies are used as fishing weights, in association with a fishing line. The line may be a simple angler's line or part of a net. The line may be attached to bait or a lure for fish, but the association of a bait or lure with a substantially translucent or transparent weight constitutes a further aspect of the present invention.

The material of a weight of the invention is, for example, a high density glass, e.g. a lead glass. Such materials are generally chemically inert and thus non-toxic to wildlife. Because the material is translucent or transparent, but depending on its refractive index, the weights in use under water would appear as a faint outline with some visual distortion. These effects would disturb the fish to a minimal extent. As a result, the weight can be placed close to the bait or lure, thus providing good control over the action and position of the bait or lure. The material may be tinted.

The weight may be attached to a line using a transparent material or a small piece of a non-transparent material, e.g. a loop of wire. The small size of any such loop or similar attachment ensures minimum visibility.

Attachment to a line may also be achieved by virtue of a cleat, or by forming the weight in the form of a cleat, of the type described above.

A specific embodiment of a weight for use in the present invention is a pear-shaped piece of a high-density, non-toxic glass having a small wire loop cast into the glass at the narrow end of the pear-shape, the ends of the wire being embedded into the glass and the loop being external to the glass. Line for attachment to the weight is then passed through, or tied on to, the wire loop.

In general, a line weight or cleat of the invention may be any suitable size, depending on its use. A line weight may be essentially spherical, cylindrical etc.

The invention has been illustrated with respect to specific embodiments, but there is no intention to so limit the invention. Rather, it is intended to cover such alternatives, modifications and equivalents as may be included within the scope of the invention as defined by the appended claims.

We claim:

1. A translucent one-piece essentially spherical body having an essentially equatorial circumferential line guide in the form of a groove essentially V-shaped in cross-section and having a line attached to said body, in which when suspended, said line passes into said V-shaped line guide along a tangent thereto, around said body within said line guide, and out of said line guide along said tangent, said line being attached to the line guide of the body by a clove-hitch knot in said line whereby said line and said body are moveable relative to each other, said body being a weight in water.

2. A body according to claim 1 in which said body is less than 10 mm in maximum dimension.

3. A body according to claim 1 in which the line is a fishing line or a part of a net.

4. A body according to claim 3 wherein the line is attached to a bait or lure for fish.

5. A body according to claim 1 wherein the translucent body is lead glass.

6. A body according to claim 1 wherein the body is placed close to the bait or lure for the fish.

* * * * *